United States Patent [19]

Thornton et al.

[11] Patent Number: 5,033,658
[45] Date of Patent: Jul. 23, 1991

[54] ACTUATOR MECHANISM FOR A ROTARY VALVE

[75] Inventors: James M. Thornton, Helensburgh, Scotland; Peter G. Longley, Rotherham, England; James F. Houghton, Erskine, Scotland

[73] Assignee: Thor Ceramics Limited, Clydebank, Scotland

[21] Appl. No.: 460,872

[22] Filed: Feb. 7, 1990

[30] Foreign Application Priority Data

Oct. 8, 1987 [GB] United Kingdom ................ 8718878

[51] Int. Cl.⁵ .............................................. B22D 41/20
[52] U.S. Cl. ..................................... 222/602; 464/123
[58] Field of Search ................ 222/591, 602; 266/236, 266/271; 464/19, 123

[56] References Cited

U.S. PATENT DOCUMENTS

| | | | |
|---|---|---|---|
| 1,439,522 | 12/1922 | Howard | 222/602 |
| 4,258,868 | 3/1981 | Drysh | 222/602 |
| 4,271,994 | 6/1981 | Seaton | 222/602 |
| 4,575,359 | 3/1986 | Bermingham | 464/123 |

FOREIGN PATENT DOCUMENTS 0196847 10/1986 European Pat. Off. .
2129471 10/1972 France .

*Primary Examiner*—S. Kastler
*Attorney, Agent, or Firm*—Sixbey, Friedman, Leedom & Ferguson

[57] ABSTRACT

A tundish (11) has located alongside it an upright support member (20). A cross arm (22) is pivotally mounted on the member (20) with one end of the cross arm (22) overlying the tundish (11). A hydraulic or pneumatic ram (25) is mounted in the member (20) for applying a downward force on the overlying end of the cross arm (24) which mounts a drive means (27) connected to the stem (14) of a rotary valve (12) for controlling the exit of hot or corrosive liquid from the tundish (11).

3 Claims, 6 Drawing Sheets

ACTUATOR MECHANISM FOR A ROTARY VALVE

This invention relates to an actuator mechanism for a rotary valve.

Rotary valves are used in steel making and in other applications where hot and corrosive liquids are handled, the valve being located in the tundish and partially surrounded by liquid which runs through an opening in the valve out of the tundish. The rotary valve consists of a domed lower portion which is attached to the lining in the tundish and a stem or 'rotor' which sits on the dome and is rotatable about its longitudinal axis for the purpose of adjusting or closing the opening.

The stem is supported by and rotated by a known actuator mechanism which consists of a cantilever support having an upright support column located adjacent to the tundish and a cross beam which overlies the tundish and is connected to opposed flats at the upper end of the column. A drive means causes the column to rotate in the desired amount in the desired direction.

In order to retain a close fit between the domed base and the stem, a downward load is applied by the end of the cross beam to which the stem is attached.

At present, said downward load is provided by a pneumatic cylinder and a square section shaft carried with the upright column. The pneumatic cylinder pulls the entire cross head downwards but such an arrangement is inefficient in that the force acting on the valve stem is considerably less than the force created by the pneumatic cylinder.

In addition, the arrangement tends to distort the top of the shaft away from the tundish and this can result in the shaft becoming immovable in its upright guide supports.

An object of this invention is to obviate or mitigate the aforementioned problems.

According to the present invention there is provided an actuator mechanism for a rotary valve, comprising an upright support member for location adjacent to a tundish and a cross arm mounted on said upright support member to overlie the tundish, said cross arm being pivotally connected to the upright support member to pivot about a horizontal axis, and vertical pressure means to act on the cross arm to cause a load to be applied in the vertical direction at the end adapted to overlie the tundish.

Preferably, drive means is mounted at the end of the cross arm which is adapted to overlie the tundish, said drive means being adapted for connection to the stem of the rotary valve.

Preferably also, the drive means is adapted for connection to the rotary stem by means of a swivel joint.

Preferably said swivel joint comprises a drive head of a square section having an end face which has a part spherical socket centrally disposed therein and a ball member having a square collar diametrically disposed such that a sector of the ball extends from opposed sides of the collar one of which and the collar are for location in the drive head with the sector in the socket thereof, the other sector being secured to or integral with a sleeve which extends away from the ball for connection to the stem of the rotary valve, said drive head being rotatably driven by the drive means to rotate the ball member via the square collar, said square collar having convex peripheral surfaces which coincide with the curvature of the ball to provide a degree of adjustment between the axis through the drive means and the longitudinal axis of the stem of the rotary valve.

Preferably, a through opening is provided in the drive means, the drive head and the ball for argon injection into the rotary valve.

According to another aspect of the invention there is provided a swivel joint device for location between a rotary drive and a rotary driven unit comprising a drive head of square cross section having an end face which has a spherical socket centrally disposed therein said drive head being for attachment to one of said drive or driven units, and a ball member having a square collar diametrically disposed such that sectors of the ball extend from opposed sides of the collar, one of which and said collar are for location in the drive head with the sector in the socket thereof, the other sector being secured to or integral with a flange for attachment to the other of said drive or driven units, the collar having convex peripheral surfaces which coincide with the curvature of the ball to provide adjustability within the drive head whereby the longitudinal axis through the drive head relative to the swivel joint device may be out of alignment with the axis through the flange.

Embodiment of the present invention will now be described, by way of example, with reference to the accompanying drawings, in which.

Figure 1:
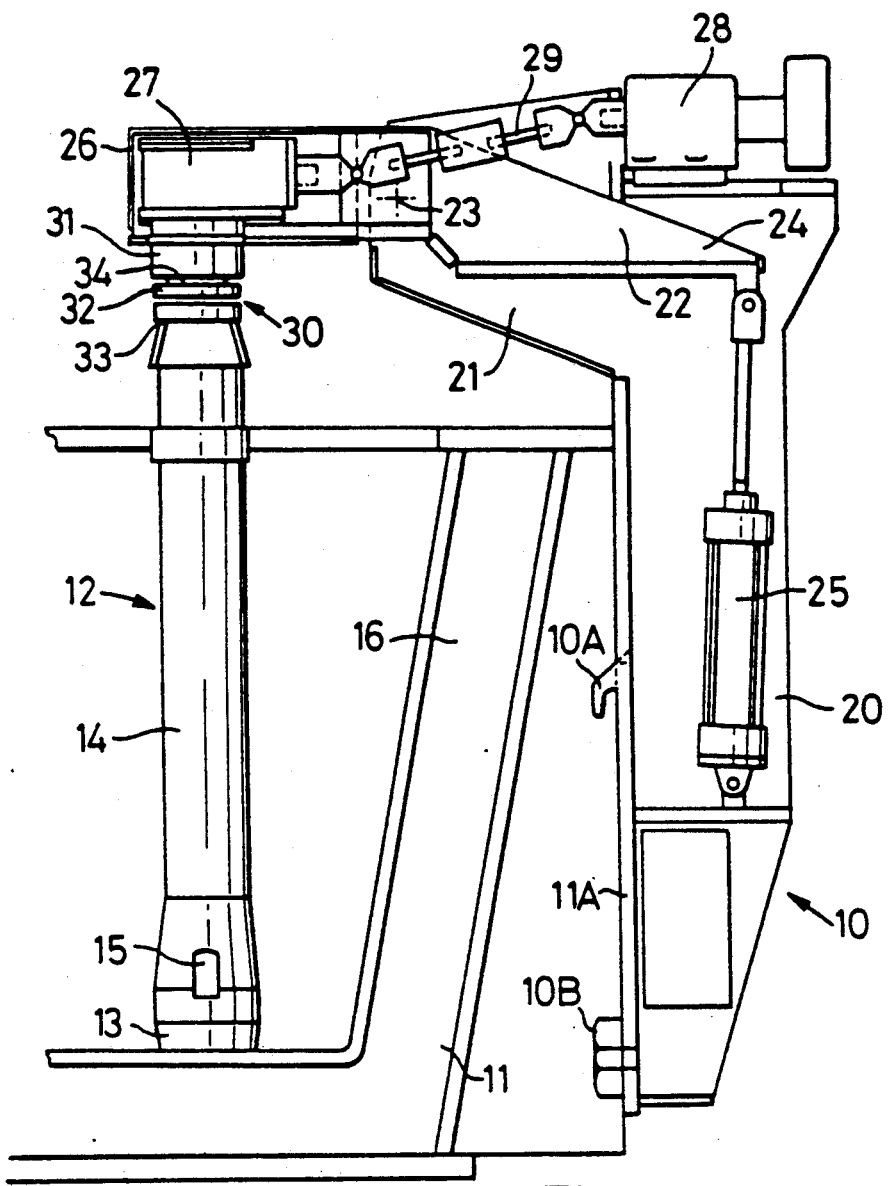
FIG. 1 is a sectional side elevation of an actuator mechanism for a rotary valve, according to the invention shown adjacent a steel making tundish and connected to a rotary valve.
Figure 2:
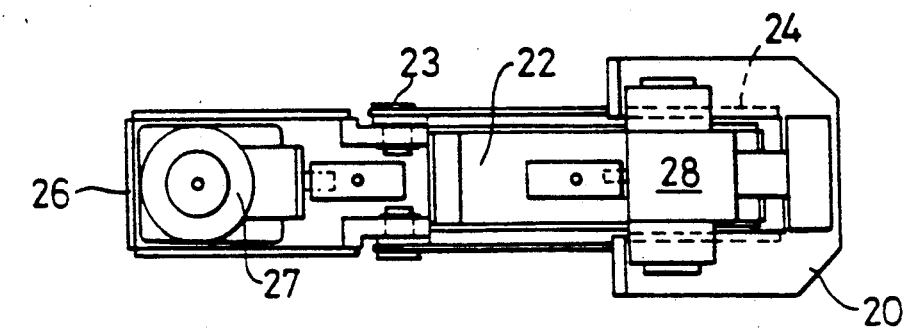
FIG. 2 is a plan view of the actuator mechanism.

Referring firstly to FIGS. 1 and 2, the actuator mechanism 10 is hooked at 10A and bolted at 10B to a structure 11A alongside a tundish 11 in which is located a refractory rotary valve 12. The rotary valve has two components, namely a domed base 13 and an upright rotary stem 14. An opening 15 is provided in the domed base and at the lower end of the column 14 and rotation of the stem can alter the size of the opening or close it completely. The domed base 13 is secured within the tundish seated in the lining 16 thereof and in use most of the rotary valve is immersed in liquid.

The uppermost portion of the rotary valve stem 14 extends out of the tundish for connection to the actuator mechanism by which a downward load is applied to the stem 14 to keep it firmly seated on the domed base 13 and a rotary force is applied to alter the opening 15.

The actuator mechanism 10 comprises an upright support column 20, the upper end 21 of which is angled to overlie at least the peripheral area of the tundish 11. A cross arm 22 is pivotally mounted on the upper end 21 of the support column 20 by a horizontal pivot at 23. One end 24, the "outer" end, of the cross arm 22 is at the support column 20 and an upright pneumatic or hydraulic jack 25 is fixedly mounted on the support column 20 and connected to that end 24 of the cross arm.

The other inner end 26 of the cross arm 22 overlies the centre of the tundish 11 and carries drive means in the form of a gearhead 27 which is connected to the rotary valve stem 14 as hereinafter described. The gearhead 27 provides the rotary force to the stem 14.

An air-cooled motor 28 is mounted on the top of the support 20 and drives the gearhead via a flexible splined coupling 29. The motor 28 may be electric, hydraulic or pneumatic to suit the environment. With adequate cooling the motor 28 may be mounted directly over the stem 14 and the transmission system dispensed with. This is advantageous where rapid control responses are required.

Thus, to provide the required downward load to the rotary valve stem 14, the pneumatic or hydraulic jack 25 applies an upward load to the outer end of the pivotal cross arm 22 and that load is translated via the pivot 23 to a downward load at the inner end of the cross arm.

The amount of downward pressure on the rotary valve stem relative to the upward pneumatic or hydraulic load depends on the position of the pivot 23 relative to the length of the cross arm, but where the pivot is at the midpoint, it is considered that a loss of only 5% would be incurred at the inner end of the cross head.

In the present embodiment the pivot is at a ratio of 3:5 being nearer the inner end of the cross arm so that the downward load will be in the region of 1.7 times that of the applied hydraulic load but that location may vary according to the design of the upright support.

The cross arm 22 is connected to the upper end of the rotary valve stem 14 by a socket joint designated generally as 30; it comprises a hollow drive head 31 connected to the gearhead 27 on cross arm 22 and rotatable about an axis at 90° to the cross arm, a flange 32 which is attached to a cap 33 which locates over the upper end of the stem 14 and engages opposed flats thereon (not shown) and a steel ball member 34 which is welded to or integral with the flange 32 and locates in the head 31.

The head 31 is box shaped of square section and has an end face 35 in which a part spherical socket 36 is centrally disposed.

Figure 4:
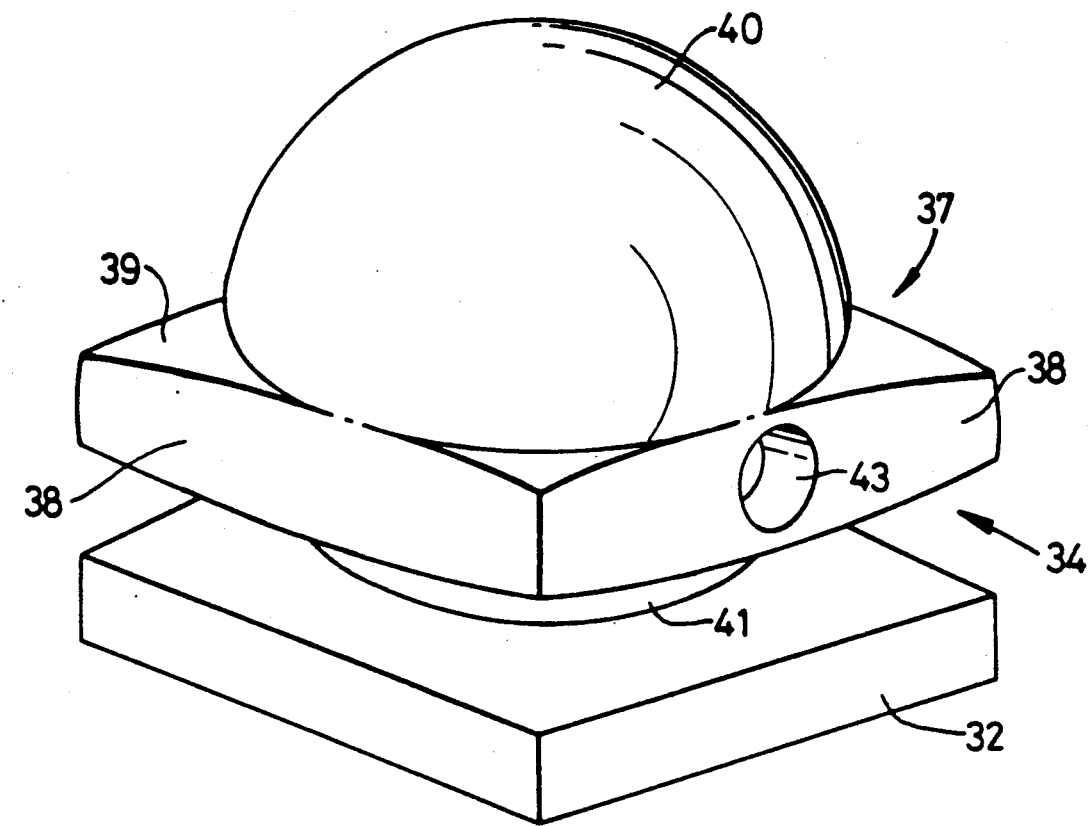
FIG. 4 is a perspective view of the ball member and bracket of the socket joint.

The ball member has a diametrically peripheral collar 37 (FIG. 4) of square shape in plan, but with convex peripheral sides 38, the convexity being equal to the curvature of the periphery of the ball. The length of the sides of the square equals the diameter of the ball so that at the midpoint of each side 38 the convex surface of the peripheral side and the diameter of the ball coincide.

One face of the collar, namely the upper face 39 has a slightly tapering downwards curvature towards the corners.

Extending from each major face of the square collar is a sector 40, 41 of the ball. The upper sector 40 locates in the socket 36 and square collar locates in the head 31 when the joint is assembled. The lower sector locates in a recess in the flange 32 and is welded therein or alternatively is forged as an integral unit to give the same effect.

The flange 32 is secured, e.g. by bolts to the stem cap 33.

Figure 3:
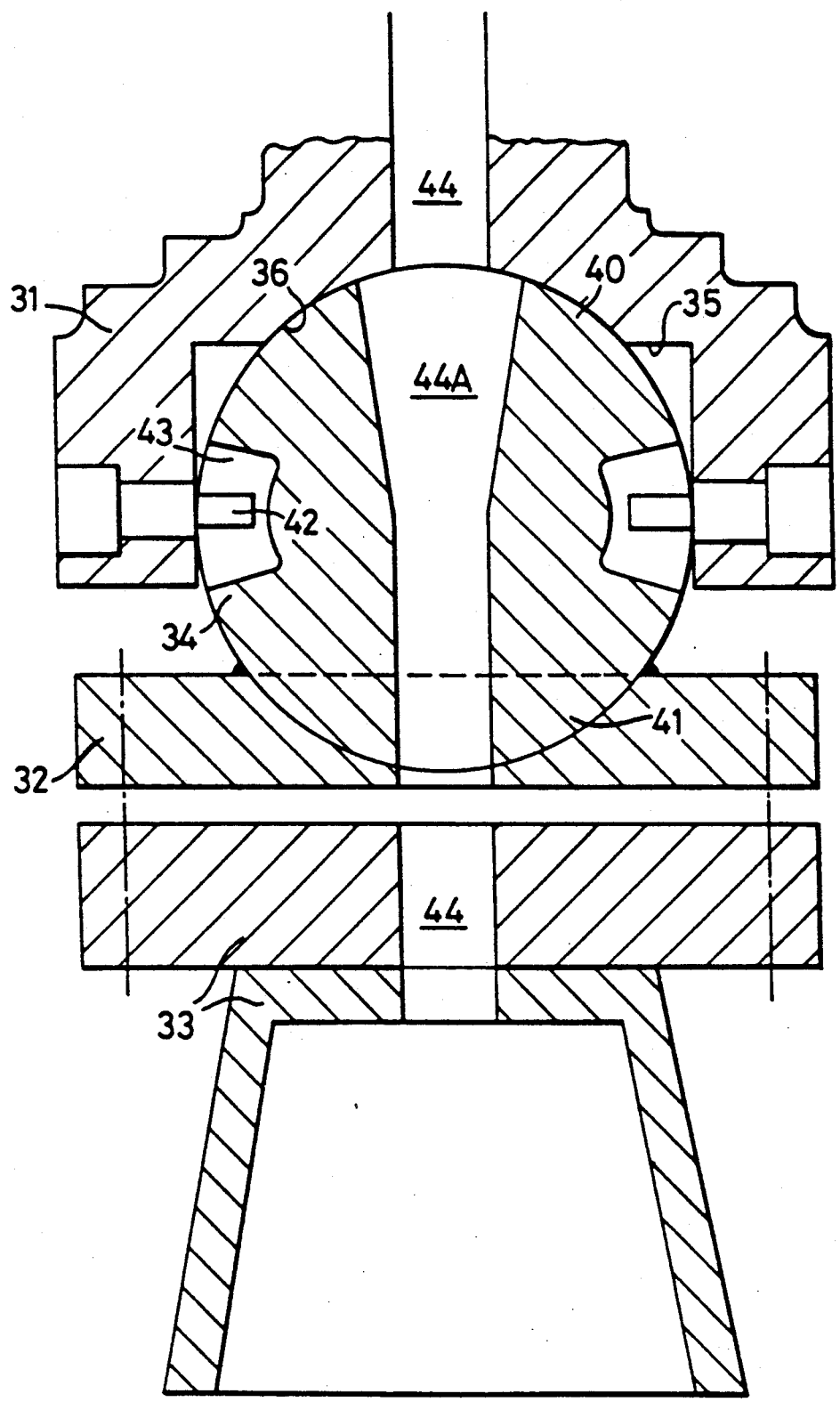
FIG. 3 is a sectional elevation of a socket joint.

The ball member 34 is secured in the head 31 by locating pins 42, FIG. 3 which pass through at least two opposed sides of the casing and into flared recesses 43 in the ball member 34. This is to allow the degree of movement of the ball member within the head 31 due to the curvature of the collar periphery and upper face and the location of the upper sector 40 of the ball in socket 36.

Thus, in connecting the gearhead 27 to the rotary valve, the gearhead 27 need not be in direct vertical alignment with the domed base 10 and a slight misalignment of the rotary valve stem 11 is therefore possible.

The stem cap 33 is of square cross section and tapers downwardly to overlie the top of the rotary valve stem.

A vertical bore 44 passes through the gearhead and ball joint to accommodate an argon gas feed pipe.

The bore in the ball member is outwardly flared at 44A in the upper sector to accommodate movement of the ball member within the head 31.

The ball joint as hereinbefore described may be applied to other apparatus between rotary drive and driven units.

An actuator mechanism as hereinbefore described has a number of advantages.

1. The pivotal action of the cross arm generates a positive downward load on the rotary valve stem thus ensuring the required pressure at the mating surfaces of the stem and dome.
2. The load applied by the piston at one end of the cross arm also raises or lowers the drive end of the cross arm and allows for variation in the height of the rotary valve stem.
3. The flexible coupling between the motor and the gearhead accommodates pivotal movement of the cross arm.
4. The "square" ball joint allows for ease of assembly of the rotary valve and takes up any misalignment of the gearhead and domed base while ensuring efficient load transfer from the piston; the tapered stem cap reduces backlash to the rotary valve stem.

The cross arm and selected other parts of the actuator mechanism are extensively insulated to minimise heat transfer from the tundish, and maintain all mechanical parts within working temperature ranges.

A mechanical off-take from the motor shaft may be provided, being transmitted though the flexible drive shaft to a mimic so that the operator of the actuator mechanism can be aware of the exact orientation of the stem in relation to the dome during operation.

Figure 5:
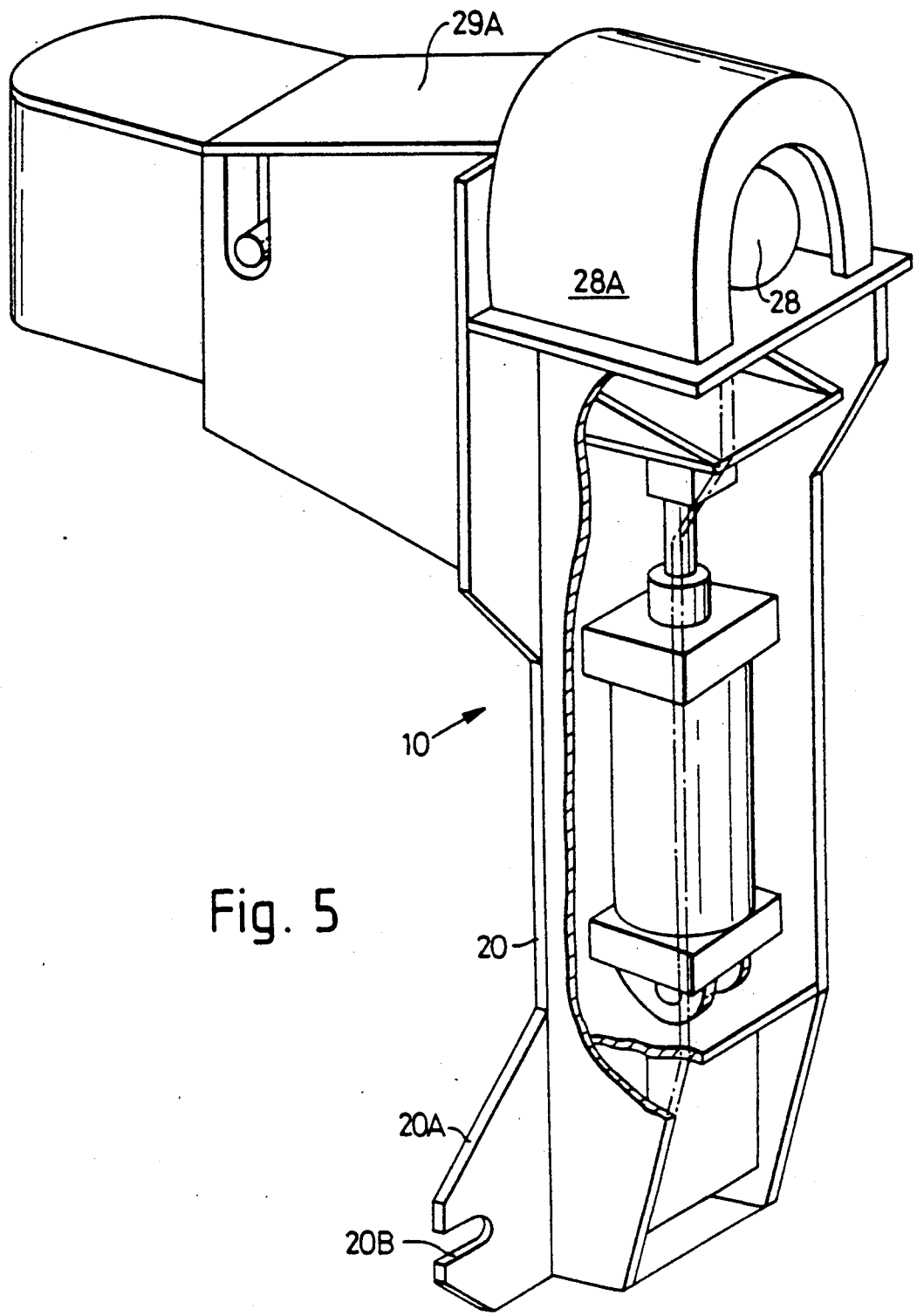
FIG. 5 is a perspective view of a modified actuator mechanism.

FIG. 5 shows, in perspective, a modified actuator mechanism 10 in which the motor 28 has a protective cover 28A and the coupling 29 has a protective cover 29A. At the lower end of the support 20 there are wings 20A having slots 20B.

Figure 6:
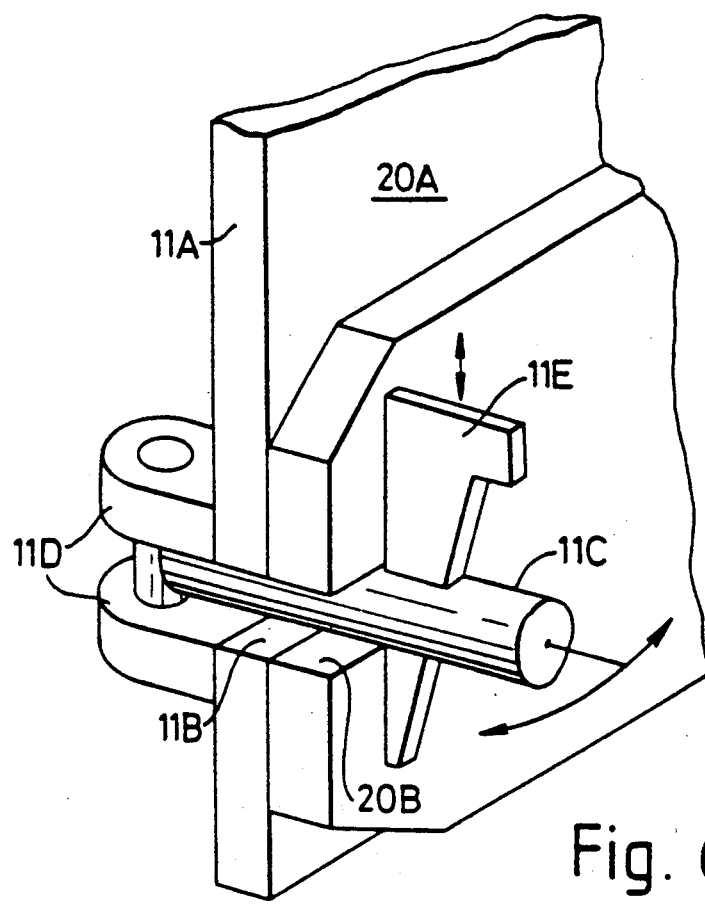
FIG. 6 shows a detail of FIG. 5.

FIG. 6 also shows the wings 20A and the slots 20B and the structure 11A having a slot 11B aligned with the slot 20B and both receiving a pin 11C. The pin 11C is pivoted at one end between ears 11D on the structure 11A and has a slot therethrough into which slot a cotter pin 11E can be hammered to easily and effectively mount the actuator mechanism 10.

Figure 7:
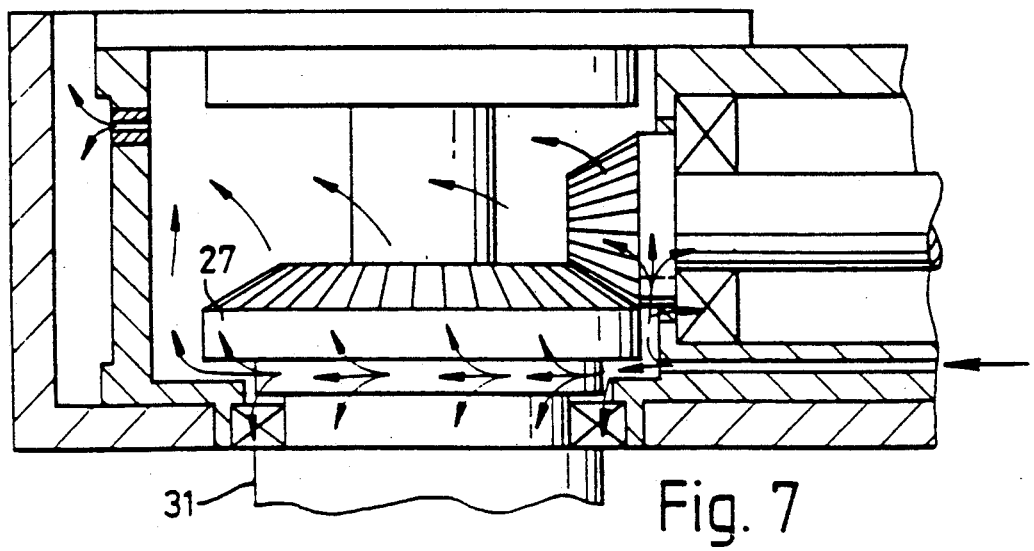
FIG. 7 shows air-cooling of the gear head in FIGS. 1 and 2.

FIG. 7 shows air-cooling can be applied to the gearhead 27 in FIGS. 1 and 2.

Figure 8:
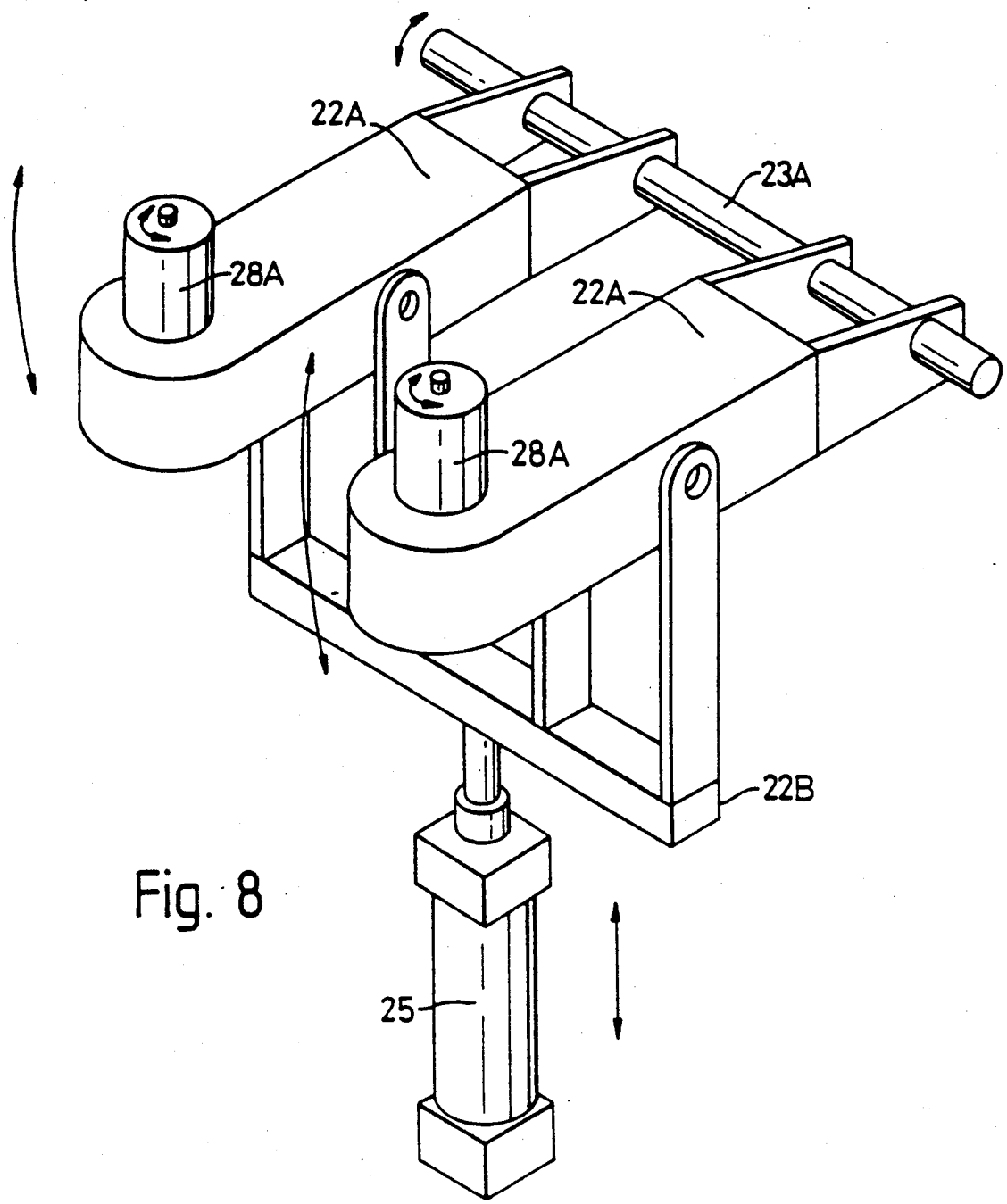
FIG. 8 shows two modified cross arms operated by a single jack.

FIG. 8 shows an arrangement wherein two cross arms 22A have their common pivot 23A at one end, instead of intermediate their ends. Each cross arm 22A has at its other end a motor 28A, which may be electric, hydraulic or pneumatic. Intermediate their ends the cross arms 22A are yoked together at 22B to be operated in common by a single hydraulic or pneumatic jack 25.

We claim:

1. An actuator mechanism for a rotary valve, comprising an upright support member for location adjacent to a tundish and a cross arm mounted on said upright support member to overlie the tundish, said cross arm being pivotally connected to the upright support member to pivot about a horizontal axis, vertical pressure applying means for applying pressure on the cross arm to cause a load to be applied in the vertical direction at an end of the cross arm which overlies the tundish, drive means mounted at the end of the cross arm which overlies the tundish, said drive means being connected to a stem of the rotary valve by means of a swivel joint which comprises a drive head of a square cross-section having an end face which has a part spherical socket centrally disposed therein and a ball member having a square collar diametrically disposed such that a sector of the ball extends from opposed sides of the collar with one sector and the collar located in the drive head with the sector in the socket thereof, and the other sector being secured to or integral with a sleeve which extends away from the ball for connection to the stem of the rotary valve, said drive head being rotatably driven by the drive means to rotate the ball member via the square collar, said square collar having convex peripheral surfaces which coincide with the curvature of the ball to provide a degree of adjustment between the axis through the drive means and the longitudinal axis of the stem of the rotary valve.

2. A mechanism according to claim 1, wherein a through opening is provided in the drive means, the drive head and the ball for permitting injection of argon into the rotary valve.

3. A swivel joint device for location between a rotary drive and a rotary driven unit comprising a drive head of square cross-section having an end face which has a spherical socket centrally disposed therein said drive head being for attachment to one of said drive or driven units, and a ball member having a square collar diametrically disposed such that sectors of the ball extend from opposed sides of the collar, one of which and said collar are for location in the drive head with the sector in the socket thereof, the other sector being secured to or integral with a flange for attachment to the other of said drive or driven units, the collar having convex peripheral surfaces which coincide with the curvature of the ball to provide adjustability within the drive head.

* * * * *